(12) United States Patent
Crary et al.

(10) Patent No.: US 9,936,760 B2
(45) Date of Patent: Apr. 10, 2018

(54) INJECTION MOLDED SHOE FRAME AND METHOD

(75) Inventors: Nathan Crary, Portland, OR (US); Stuart Jenkins, Goleta, CA (US)

(73) Assignee: DECKERS OUTDOOR CORPORATION, Goleta, CA (US)

( * ) Notice: Subject to any disclaimer, the term of this patent is extended or adjusted under 35 U.S.C. 154(b) by 114 days.

(21) Appl. No.: 13/359,422

(22) Filed: Jan. 26, 2012

(65) Prior Publication Data

US 2012/0186107 A1 Jul. 26, 2012

Related U.S. Application Data

(60) Provisional application No. 61/436,450, filed on Jan. 26, 2011.

(51) Int. Cl.

| | | |
|---|---|---|
| *A43B 3/24* | (2006.01) | |
| *A43B 3/00* | (2006.01) | |
| *A43B 13/12* | (2006.01) | |
| *A43B 13/22* | (2006.01) | |
| *A43B 13/24* | (2006.01) | |
| *A43B 23/02* | (2006.01) | |
| *A43B 23/26* | (2006.01) | |
| *B29D 35/00* | (2010.01) | |
| *B29D 35/02* | (2010.01) | |
| *B29D 35/12* | (2010.01) | |
| *B29D 35/14* | (2010.01) | |

(52) U.S. Cl.
CPC ............... *A43B 3/24* (2013.01); *A43B 3/0078* (2013.01); *A43B 3/242* (2013.01); *A43B 13/12* (2013.01); *A43B 13/22* (2013.01); *A43B 13/24* (2013.01); *A43B 23/025* (2013.01); *A43B 23/0215* (2013.01); *A43B 23/0255* (2013.01); *A43B 23/26* (2013.01); *B29D 35/0009* (2013.01); *B29D 35/02* (2013.01); *B29D 35/12* (2013.01); *B29D 35/126* (2013.01); *B29D 35/142* (2013.01)

(58) Field of Classification Search
CPC ........... A43B 3/24; A43B 3/242; A43B 3/244; A43B 3/20; A43B 13/36; A43B 5/18
USPC .................... 36/103, 100, 101, 15, 31, 25 R
See application file for complete search history.

(56) References Cited

U.S. PATENT DOCUMENTS

| | | | | |
|---|---|---|---|---|
| 3,040,454 A | * | 6/1962 | Topper et al. ..................... 36/51 |
| 3,994,080 A | * | 11/1976 | Flanagan, Jr. ........... A43B 3/24 36/100 |
| 4,509,276 A | | 4/1985 | Bourque | |
| 4,535,554 A | * | 8/1985 | De Obaldia B. ................ 36/113 |
| 4,958,447 A | * | 9/1990 | DuPree ........................... 36/101 |

(Continued)

*Primary Examiner* — Megan Lynch
(74) *Attorney, Agent, or Firm* — Greer, Burns & Crain, Ltd.

(57) ABSTRACT

Multiple shoe types are made from a plurality of generic molded base frames including a midsole and at least one upper portion integrally molded together. A first set of upper components is provided for forming a first shoe type secured to a first portion of the base frames and a second set of upper components is provided for forming a second shoe type secured to a second portion of the base frames. The upper portion that is integrally molded with the midsole may be a forefoot panel or a quarter. The various types formed from the generic frame include sneakers, backless shoes, slip-ons, skate shoes and boots. The generic unitary molded frame construction substantially reduces the cost of manufacture.

16 Claims, 15 Drawing Sheets

(56) References Cited

U.S. PATENT DOCUMENTS

| | | | |
|---|---|---|---|
| 5,065,531 A * | 11/1991 | Prestridge | 36/100 |
| 5,109,614 A * | 5/1992 | Curry | 36/100 |
| 5,381,609 A | 1/1995 | Hieblinger | |
| 5,647,150 A | 7/1997 | Romanato et al. | |
| 5,659,979 A * | 8/1997 | Sileo | 36/54 |
| 5,822,888 A * | 10/1998 | Terry | 36/100 |
| 5,848,484 A * | 12/1998 | Dupree et al. | 36/101 |
| 5,875,566 A | 3/1999 | Bourdeau et al. | |
| 5,992,058 A * | 11/1999 | Jneid | 36/100 |
| 6,105,280 A | 8/2000 | Marcolin | |
| 6,212,797 B1 * | 4/2001 | Merry et al. | 36/101 |
| 6,237,251 B1 * | 5/2001 | Litchfield et al. | 36/25 R |
| 6,374,516 B1 * | 4/2002 | Bonaventure et al. | 36/115 |
| 6,499,233 B1 | 12/2002 | Chenevert | |
| 6,855,281 B2 | 2/2005 | Gumringer et al. | |
| 7,210,251 B1 * | 5/2007 | Rolle | A43B 1/0081 36/100 |
| 7,350,321 B2 | 4/2008 | Soon et al. | |
| 7,562,470 B2 | 7/2009 | Keen | |
| 7,631,440 B2 | 12/2009 | Keen et al. | |
| 8,065,821 B1 * | 11/2011 | Reid | A43B 3/242 36/1.5 |
| 2005/0097781 A1 * | 5/2005 | Greene | 36/100 |
| 2005/0229435 A1 * | 10/2005 | Shih | 36/101 |
| 2005/0267775 A1 * | 12/2005 | Willis | 705/1 |
| 2006/0143951 A1 * | 7/2006 | Yang et al. | 36/100 |
| 2006/0156587 A1 * | 7/2006 | Pawlus et al. | 36/100 |
| 2007/0199210 A1 | 8/2007 | Vattes et al. | |
| 2007/0227039 A1 * | 10/2007 | Chaney et al. | 36/15 |
| 2008/0127519 A1 * | 6/2008 | Byrne et al. | 36/102 |
| 2008/0134543 A1 * | 6/2008 | Klein | 36/92 |
| 2008/0168681 A1 * | 7/2008 | Andersen | A43B 3/0047 36/100 |
| 2008/0168684 A1 * | 7/2008 | Khalifa | 36/102 |
| 2008/0235992 A1 * | 10/2008 | Stefani | 36/101 |
| 2008/0244932 A1 | 10/2008 | Nau | |
| 2008/0289222 A1 * | 11/2008 | Candrian et al. | 36/101 |
| 2009/0071035 A1 | 3/2009 | LaRochelle | |
| 2010/0000126 A1 * | 1/2010 | Ortner | 36/101 |
| 2010/0018079 A1 | 1/2010 | Albert | |
| 2010/0083536 A1 * | 4/2010 | Barrow | A43B 3/0078 36/100 |
| 2010/0083538 A1 * | 4/2010 | Curry | 36/101 |
| 2010/0115794 A1 * | 5/2010 | Gillett | 36/101 |
| 2010/0122473 A1 * | 5/2010 | Santos | 36/100 |
| 2010/0186258 A1 * | 7/2010 | Garza | 36/101 |
| 2010/0236100 A1 * | 9/2010 | Ho | 36/100 |
| 2010/0293811 A1 | 11/2010 | Truelsen | |
| 2011/0010964 A1 * | 1/2011 | Hardy et al. | 36/103 |
| 2011/0154694 A1 * | 6/2011 | Yamane | A43B 3/242 36/30 R |
| 2011/0283564 A1 * | 11/2011 | Stillwagon | 36/101 |

* cited by examiner

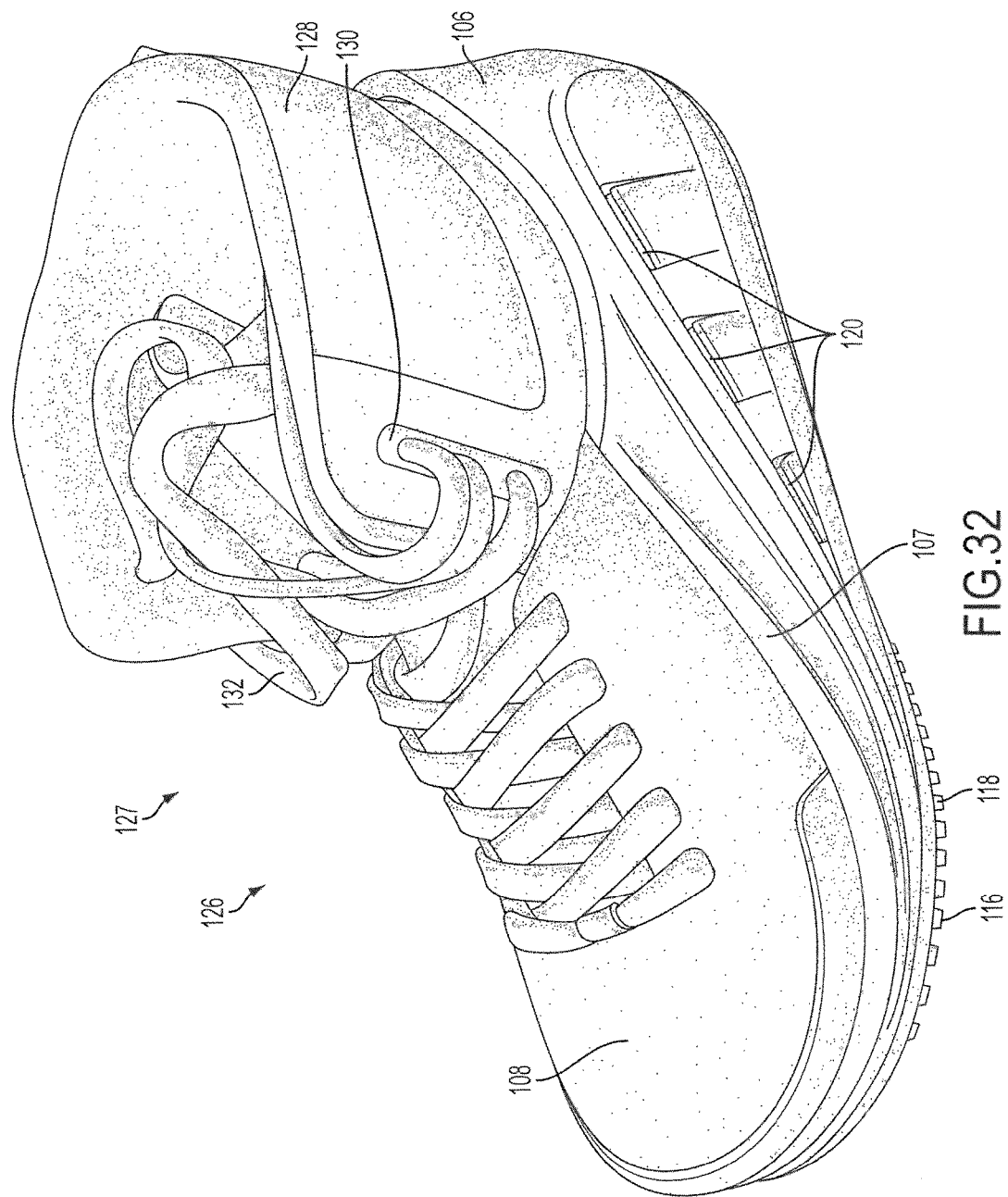

INJECTION MOLDED SHOE FRAME AND METHOD

BACKGROUND OF THE INVENTION

The present invention relates generally to injection molded footwear, and more specifically, to an injection molded base platform where different types of footwear can be created from the same base by varying design elements.

SUMMARY OF INVENTION

Embodiments of the present invention are directed to different styles of footwear having a common frame and a process for manufacturing same. Different styles of footwear are produced by securing different footwear elements such as upper portions, heel collars, panels and tongues, and outsole elements to a single base frame. Yet another feature is that the molded base frame is manufactured using an efficient injection molding technique, without lasts.

More specifically, a plurality of generic molded base frames including a midsole and at least one upper portion integrally molded together. A first set of upper components is provided for forming a first shoe type secured to a first portion of the base frames and a second set of upper components is provided for forming a second shoe type secured to a second portion of the base frames. The footwear collection includes plural shoe types assembled from the generic base frames.

Also provided is a method of making a footwear collection, the collection including at least first and second shoe types, and the method including molding a multiplicity of generic base frames having a midsole and a upper portion unitarily molded together; attaching one or more outsole components to each of the base frames; providing a first set of upper components and a second set of upper components; attaching the first set of upper components to a first portion of the molded base frames to form the first shoe type; and attaching the second set of upper components to a second portion of the molded base frames to form the second shoe type.

Finally, a method of making footwear including forming a plurality of shoe frames by injecting molding a unitary, integral midsole and upper panel; securing to a portion of the frames a first upper element and a first outsole element to form a first style of footwear; and securing to another portion of the frames a second upper element and a second outsole element to form a second style of footwear, the second upper element and second outsole being different from the first upper element and the second upper element, respectively.

BRIEF DESCRIPTION OF THE DRAWINGS

FIG. 32 is a top perspective view of the high top embodiment of FIG. 31.

DETAILED DESCRIPTION OF THE EMBODIMENT

Figure 1:
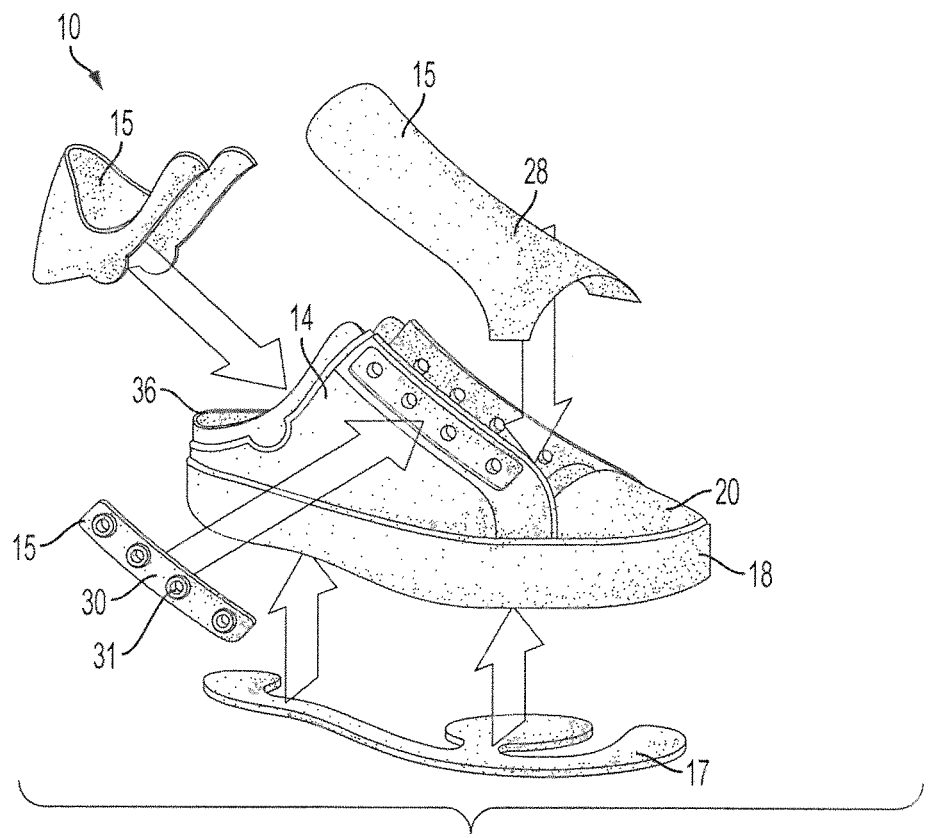
FIG. 1 is an exploded view of one embodiment of a molded shoe frame with upper and outsole elements.
Figure 2:
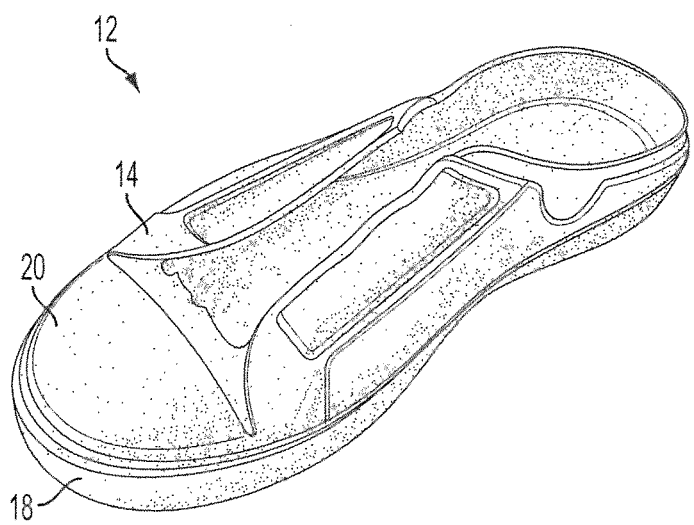
FIG. 2 is a top perspective view of a first molded shoe frame embodiment.
Figure 3:
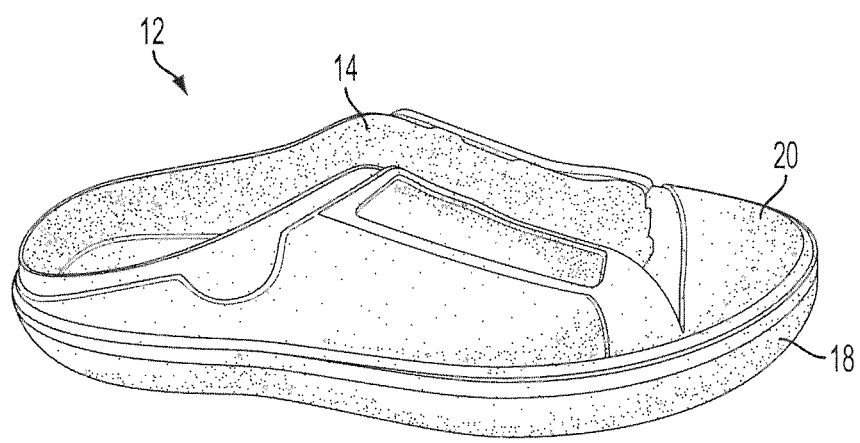
FIG. 3 is a side view of the molded shoe frame of FIG. 2.
Figure 4:
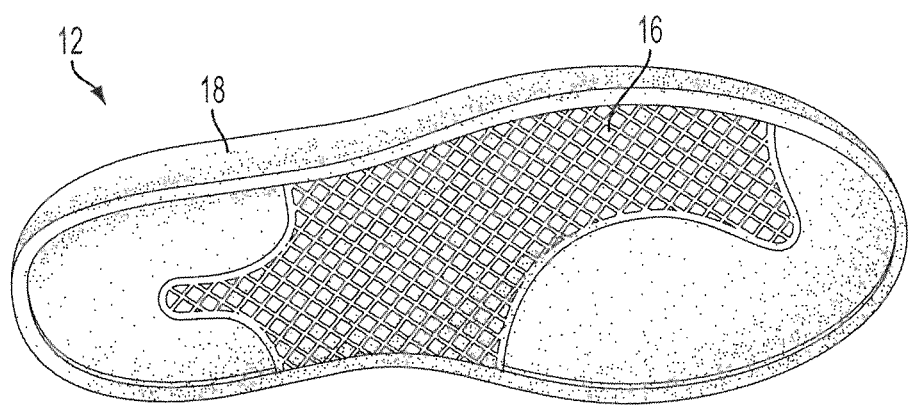
FIG. 4 is a bottom view of the molded shoe frame of FIG. 2.
Figure 5:
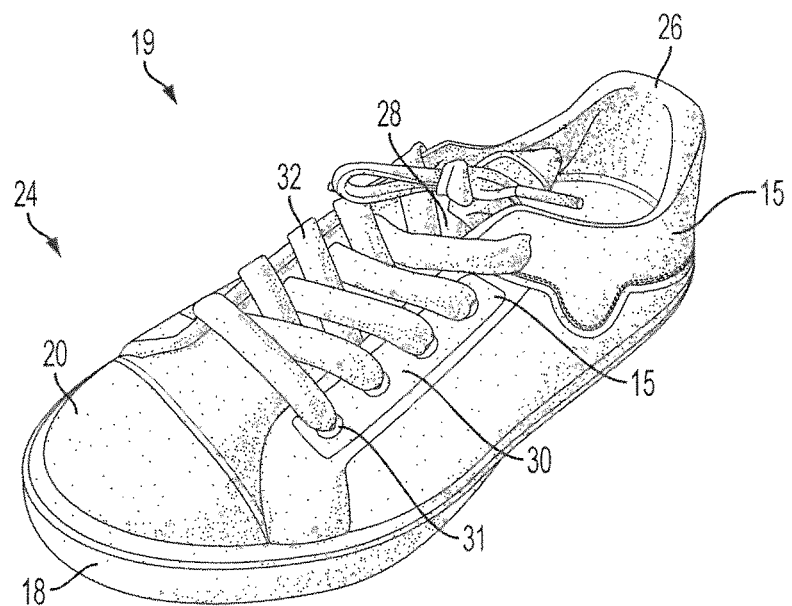
FIG. 5 is a top perspective view of a sneaker embodiment using the molded frame of FIGS. 2-4.
Figure 6:
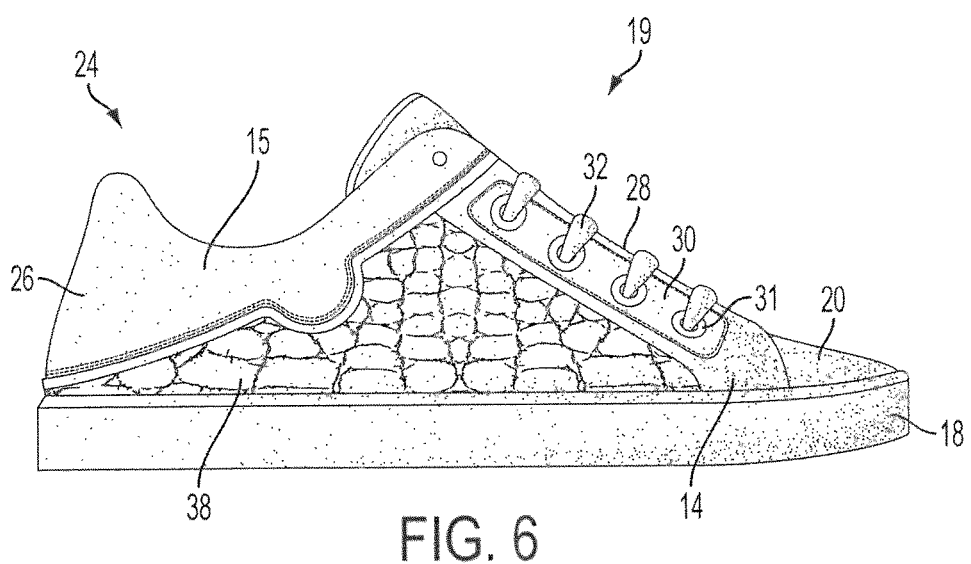
FIG. 6 is a side view of the sneaker embodiment similar to that of FIG. 5 but illustrating different decorative features.
Figure 7:
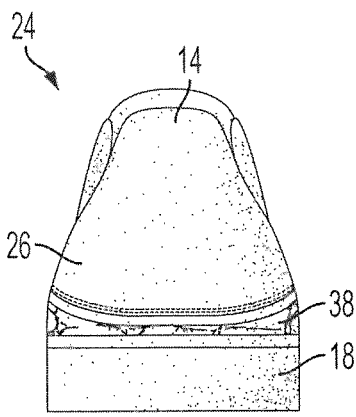
FIG. 7 is a rear view of a sneaker embodiment of FIG. 6.
Figure 8:
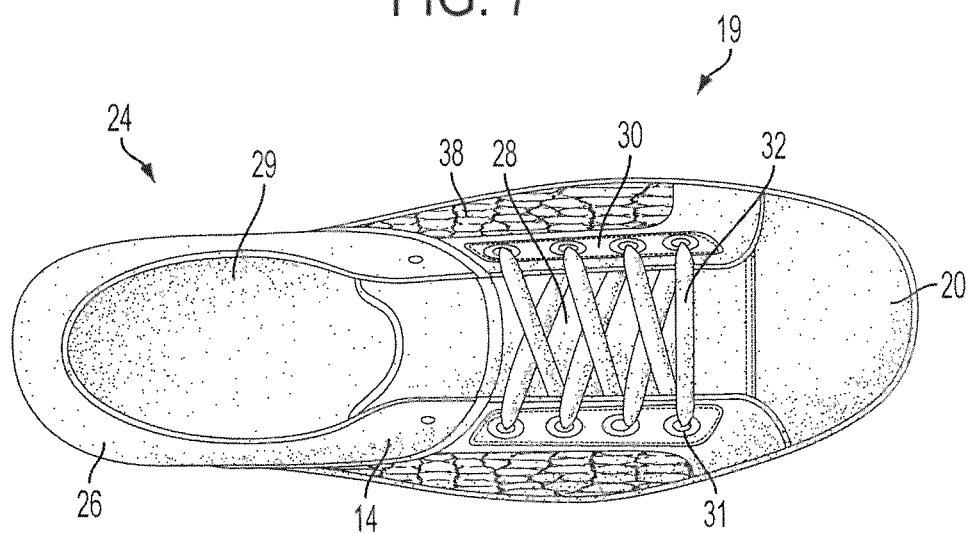
FIG. 8 is a top view of a sneaker of FIG. 6.

Referring now to FIGS. 1-4, an article of footwear 10 includes an integrally molded base frame 12 having upper panels 14, outsole 16, midsole 18 and toe cap 20. The frame 12 is unitarily molded using known injection molding techniques preferably from injected ethylene vinyl acetate (EVA), however other materials could be used that have adequate strength, durability, flexibility and cushioning. This enables the footwear 10 to be constructed without conventional lasts, thus substantially reducing cost. In addition, upper components 15, insole 29, and outsole components 17 can be attached to the frame 12 with adhesives, sewing or other fastening means.

A first sneaker embodiment 24 is shown in FIGS. 1 and 5-9. The sneaker 24 incorporates the molded base frame 12 of FIGS. 2-4. Sneaker 24 further comprises a first set of upper components 19 including a quarter 26, tongue 28 and a pair of eye stay overlays 30 that are attached to the frame 12. The quarter 26 and tongue 28 are preferably fabricated from fabric, leather or other materials. An insole or footbed 29 can be inserted within the frame 12. Eyelet elements 31 and laces 32 or other closure means are attached as shown. One or more outsole elements 17 are attached with adhesives to the bottom of the frame element 12.

FIGS. 10-14 illustrate a backless shoe, mule or clog embodiment 34. Backless shoe 34 utilizes the same frame 12 as used to form the sneaker 24, but comprises a second set of upper components 35. The second set of components 35 include an abbreviated quarter 36, a vamp 27 and plates 37 in lieu of eye stays. The abbreviated quarter 36 preferably comprises a wrap or liner extension at the throat of the upper, and may be fabricated from leather, fabric or other material. Vamp 27 is preferably genuine or artificial leather and is secured to the toe cap 20 and upper panel 14 by sewing or other conventional means. Alternatively, vamp 27 may comprise goring elastic fabric. Another alternative is to integrally mold vamp 27 with the upper panel 14 and toe cap 20 of the base frame 12. In addition, backless shoe 34 further comprises outsole components 17 which may be the same or different from the sneaker embodiment 24. Again, the second set of upper components 35 are configured for attachment to the generic base frame 12.

FIGS. 15-19 illustrate a skate shoe embodiment 40. Skate shoe 40 utilizes the same frame 12 as used to form the sneaker 24 and backless shoe 34, but comprises a third set of upper components 41. The third set of upper components 41 includes an ankle-length quarter 42, tongue 28, a pair of eye stay overlays 30, and laces 32. Like the sneaker configuration 24, eye stay overlays 30 are attached to the frame 12, and laces 32 are secured to the eye stays.

Figure 9:
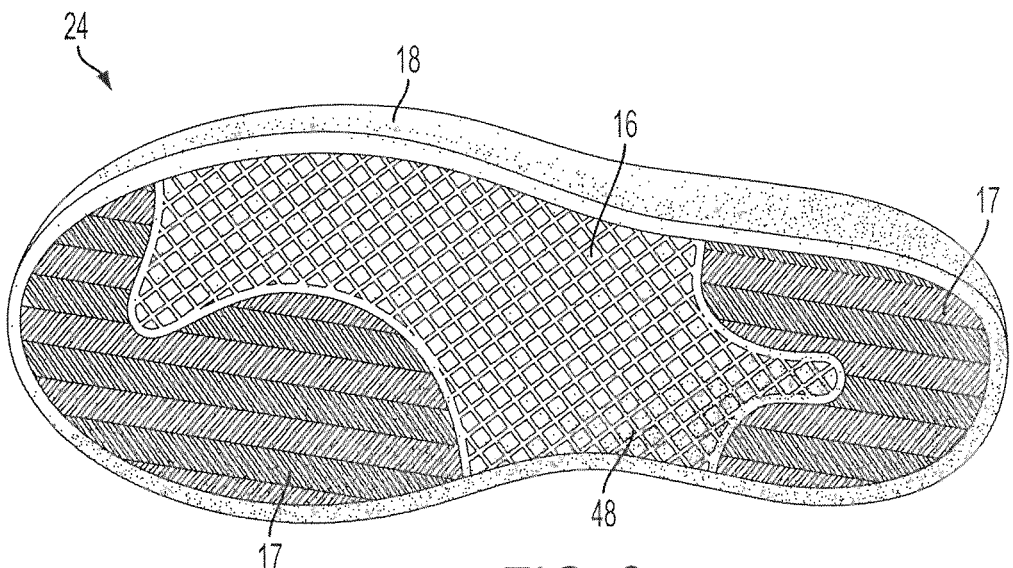
FIG. 9 is a bottom view of the sneaker embodiment of FIG. 6.
Figure 10:
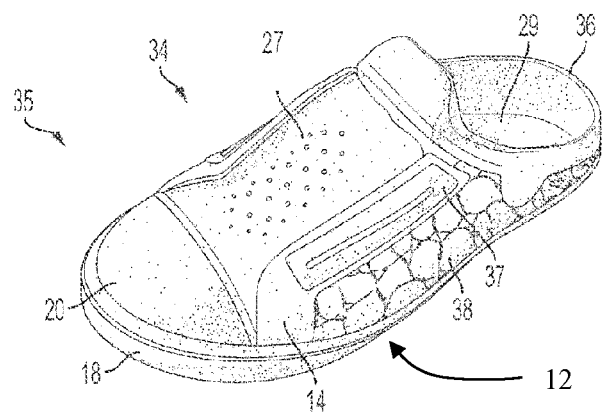
FIG. 10 is a top perspective view of an open heeled shoe embodiment using the molded shoe frame of FIGS. 2-4.
Figure 11:
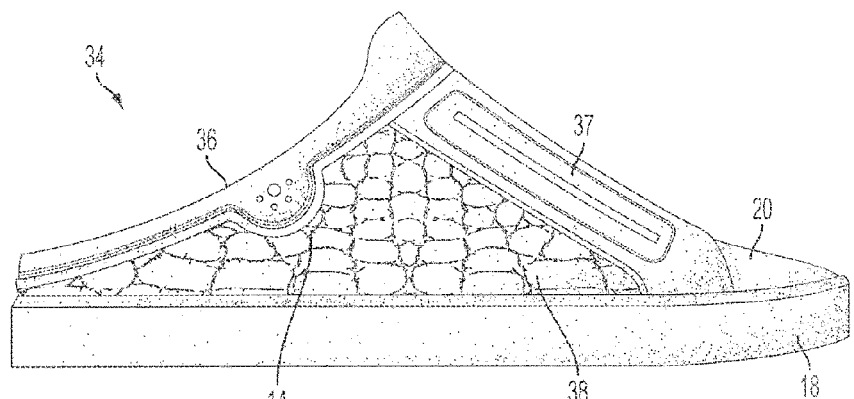
FIG. 11 is a side view of the clog embodiment of FIG. 10.
Figure 12:
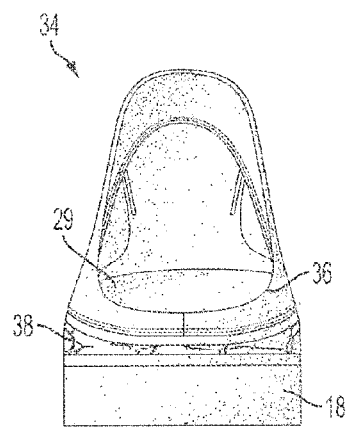
FIG. 12 is a rear view of the clog embodiment of FIG. 10.
Figure 13:
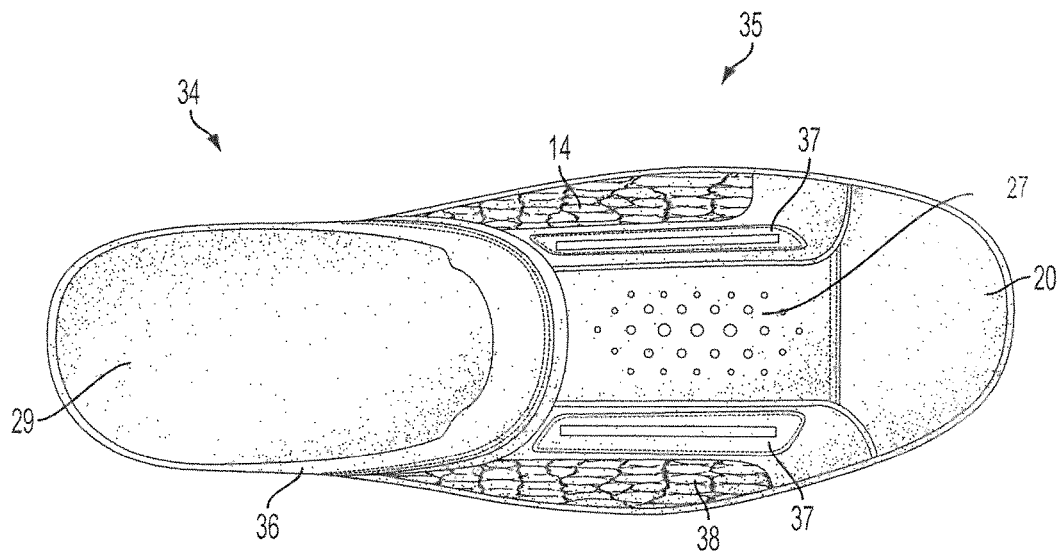
FIG. 13 is a top view of the clog embodiment of FIG. 10.
Figure 14:
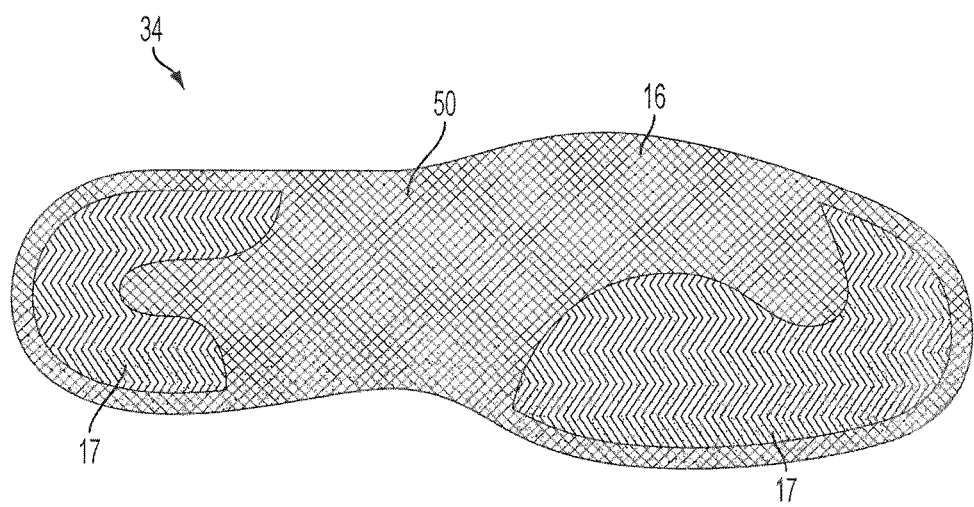
FIG. 14 is a bottom view the clog embodiment of FIG. 10.
Figure 15:
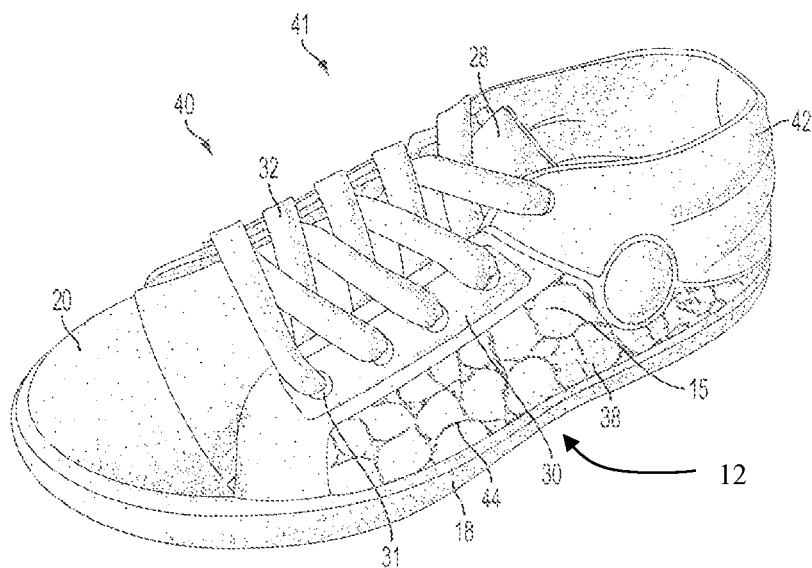
FIG. 15 is a top perspective view of a skate shoe embodiment using the molded shoe frame of FIGS. 2-4.
Figure 16:
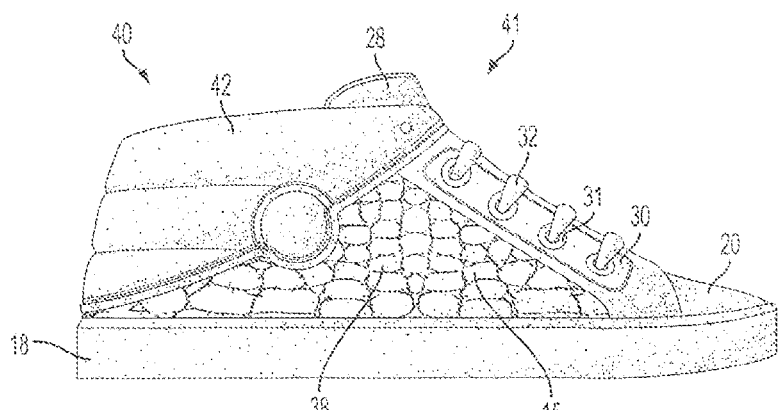
FIG. 16 is a side view of the skate shoe embodiment of FIG. 15.
Figure 17:
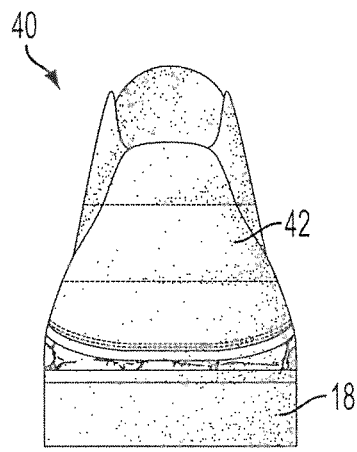
FIG. 17 is a rear view of the skate shoe embodiment of FIG. 15.
Figure 18:
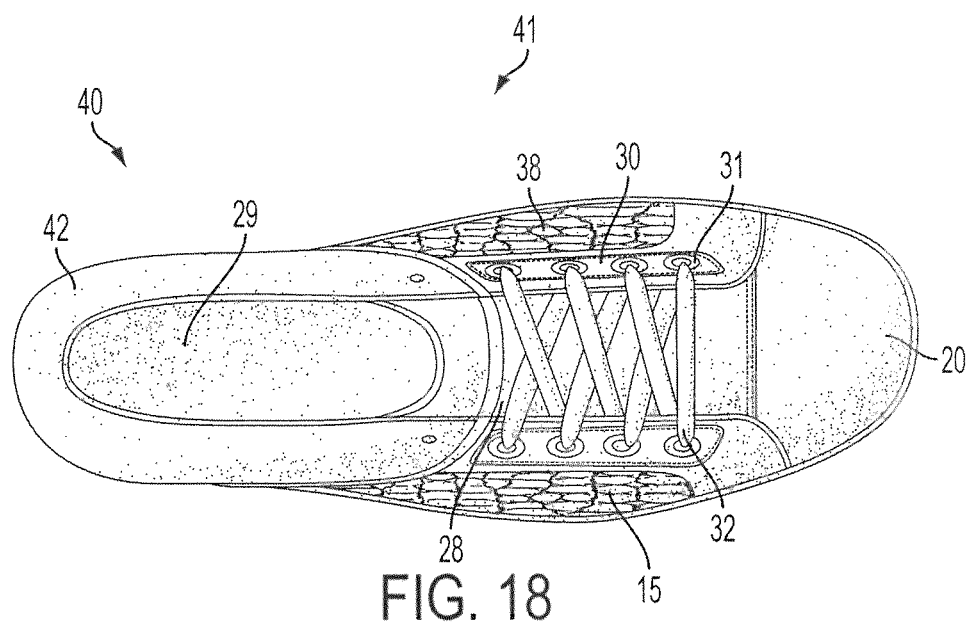
FIG. 18 is a top view of the skate shoe embodiment of FIG. 15.
Figure 19:
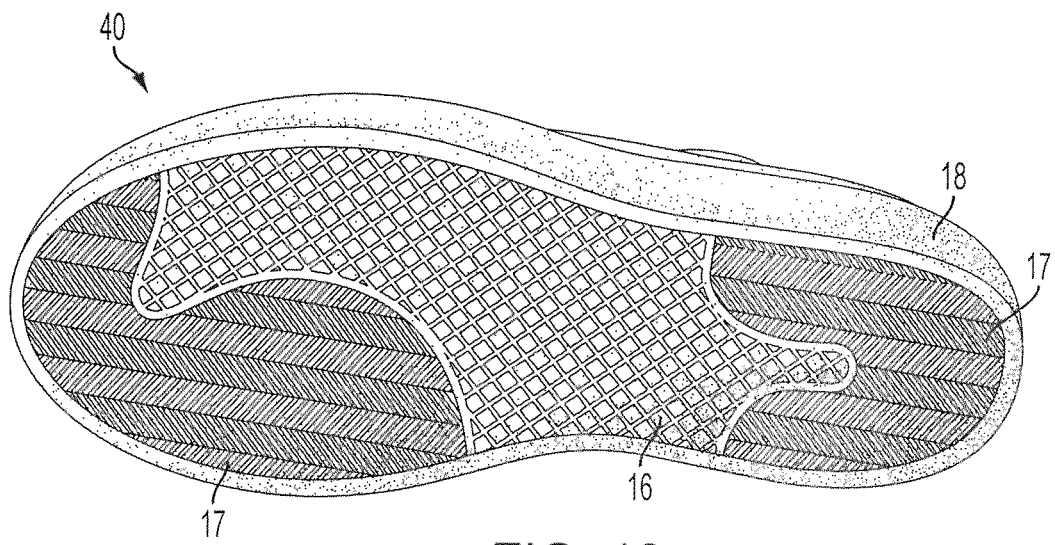
FIG. 19 is a bottom view of the skate shoe embodiment of FIG. 15.
Figure 20:
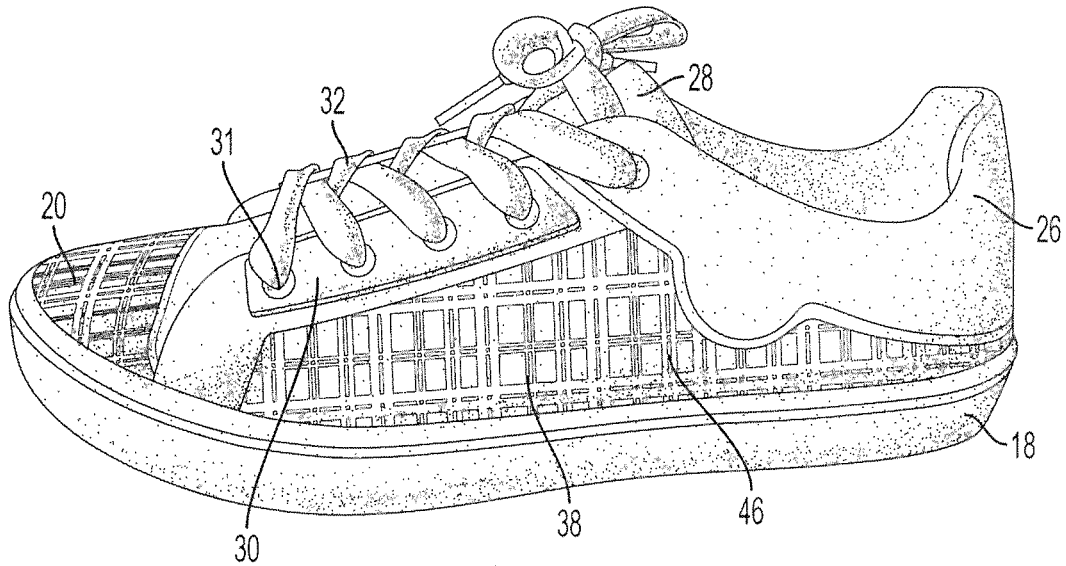
FIG. 20 is a side view of a second sneaker embodiment using the molded shoe frame of FIGS. 2-4 with a different upper design.

Portions of the base frame 12 can be manufactured with different optional surface designs and textures 38, as shown for example in FIGS. 15 and 20. A first exemplary crocodile design 44 on the upper panel 14 is shown in FIG. 15 and a second exemplary plaid design 46 on the upper panel 14 and toe cap 20 portions is shown in FIG. 20. Similarly, a first exemplary tread pattern design 46 for the outsole portion 17 of frame 12 is shown in FIG. 9 and a second exemplary tread pattern design 48 for the outsole portion 17 of frame 12 is shown in FIG. 14.

Figure 21:
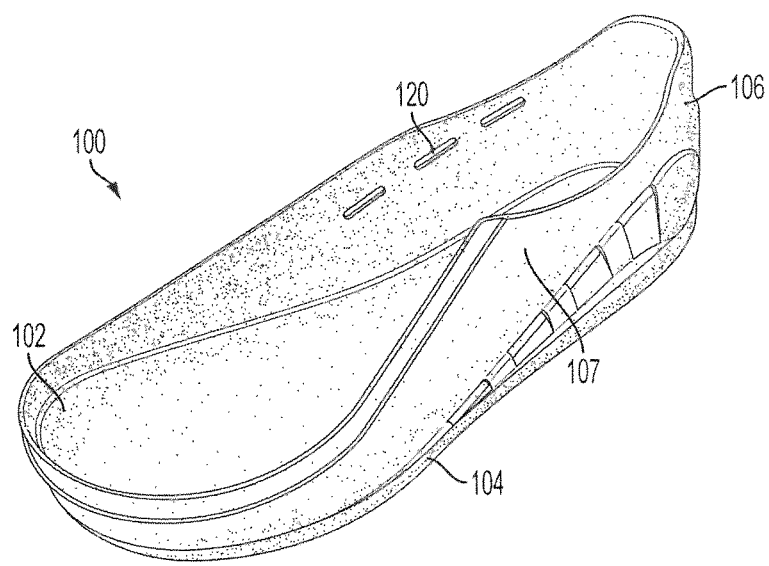
FIG. 21 is a top perspective view of a second molded shoe frame embodiment of the invention.
Figure 22:
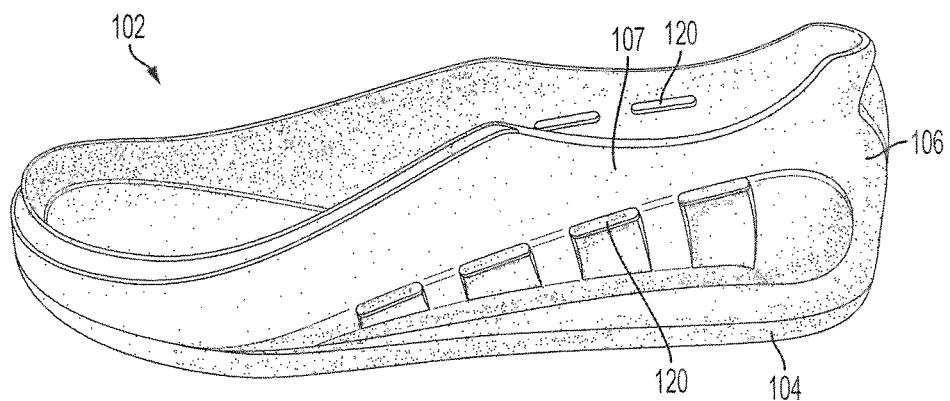
FIG. 22 is a side view of the molded shoe frame of FIG. 21.
Figure 23:
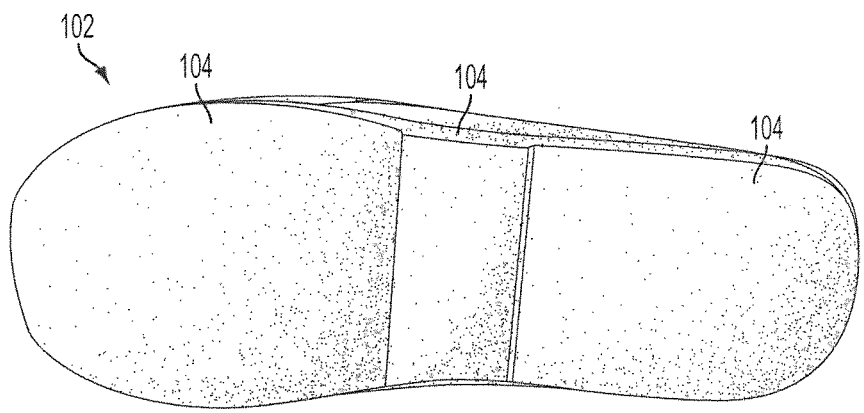
FIG. 23 is a bottom view of the molded shoe frame of FIG. 21.
Figure 24:
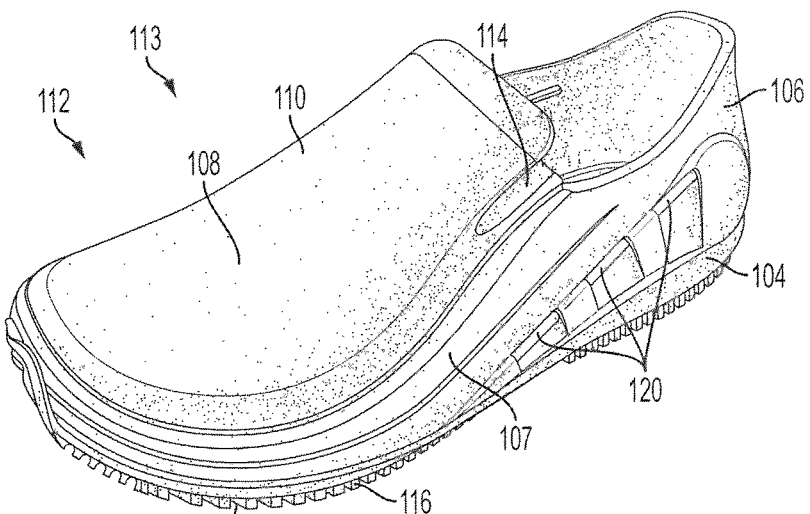
FIG. 24 is a top perspective view of a slip on embodiment using the molded shoe frame of FIGS. 21-23.
Figure 25:
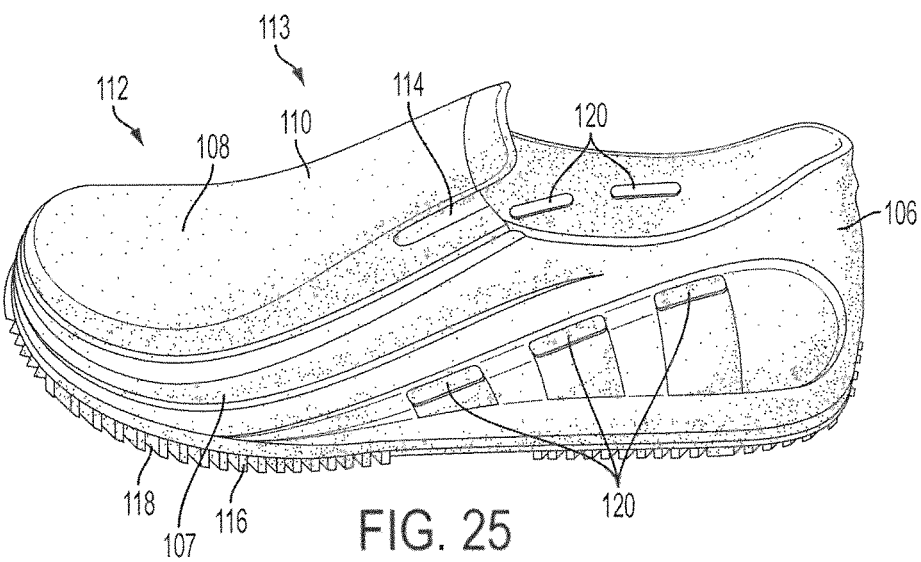
FIG. 25 is a side view of the slip on embodiment of FIG. 24.
Figure 26:
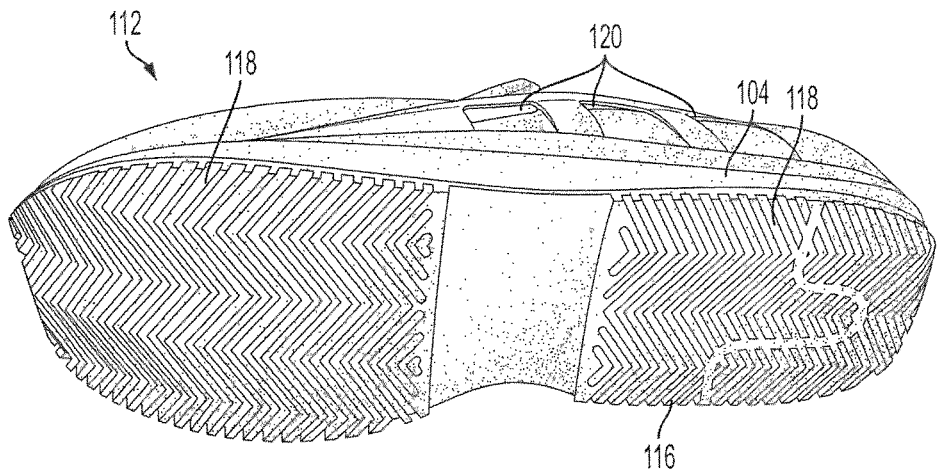
FIG. 26 is a bottom view of the slip on embodiment of FIG. 24.
Figure 30:
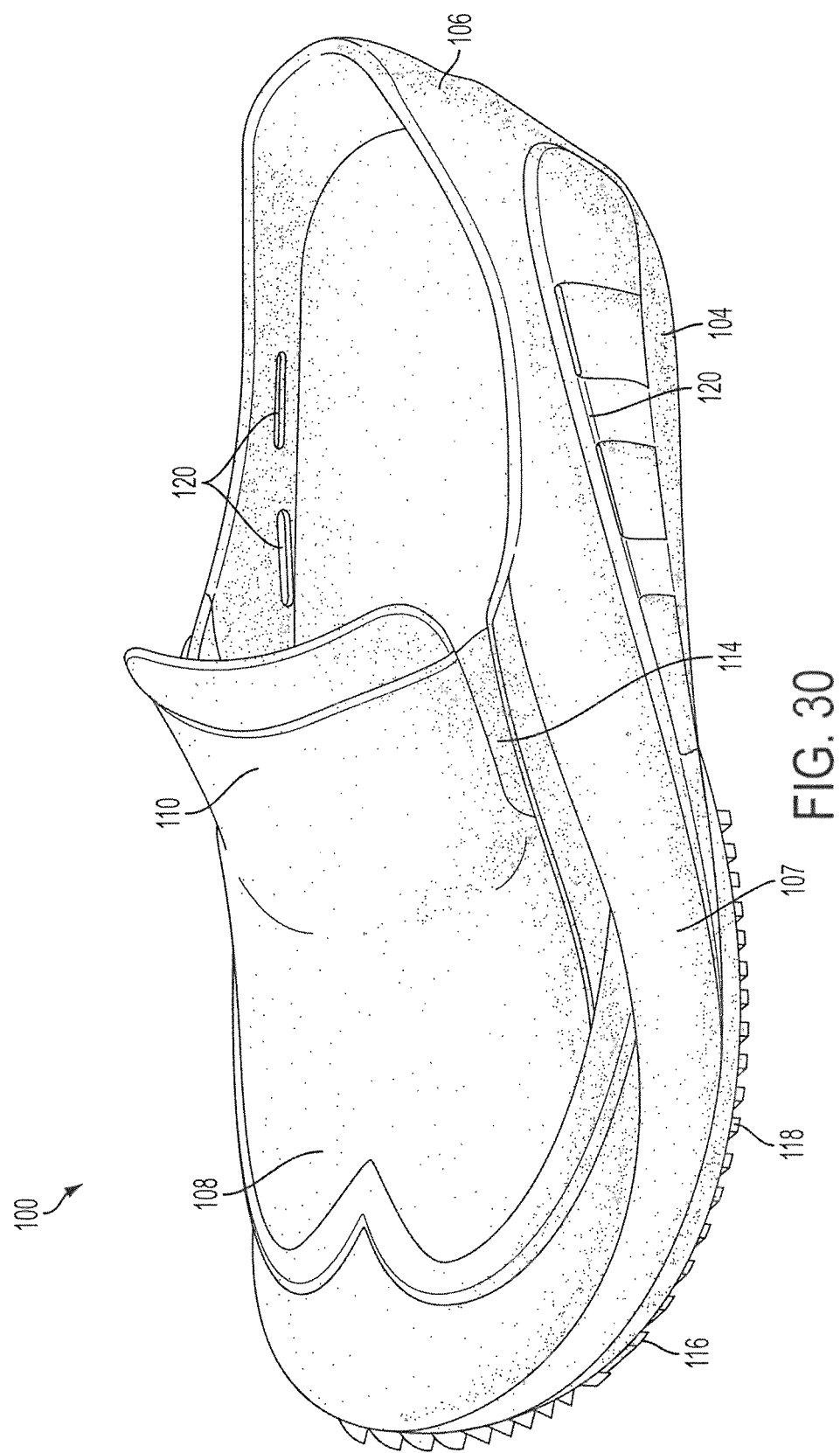
FIG. 30 is a top perspective view of a third slip on embodiment using the molded shoe frame of FIGS. 21-23.

Another base frame embodiment 100 is shown in FIGS. 21-23. In this embodiment, the frame 102 comprises molded midsole 104, quarter 106 and upper panel 107. Base frame 100 does not include an outsole portion. Moving now to FIGS. 24-26, the frame 102 is adapted to receive different types upper components 108, and in particular a vamp 110. FIGS. 24-26 illustrate a slip-on embodiment 112 suitable for use as a working shoe, such as by restaurant employees. The slip-on shoe 112 incorporates the molded base frame 102 of FIGS. 21-23 and further comprises a first set of upper components 113 including a leather vamp 110 sewn to the frame 102 and elastic goring 114 on the medial and laterals sides of the vamp. An alternate vamp design is shown in FIG. 30. Further, an outsole 116 is secured to the bottom of the frame 102 with an adhesive. In this particular embodiment 112, the outsole 116 is molded from oil and grease resistant material and is provided with a tread pattern 118 to reduce the potential for slipping on restaurant and kitchen floors. Slip-on shoe 112 also has a plurality of openings 120 along the upper panel 107 of the frame for ventilation and/or to allow water drainage (for water shoe applications).

Figure 27:
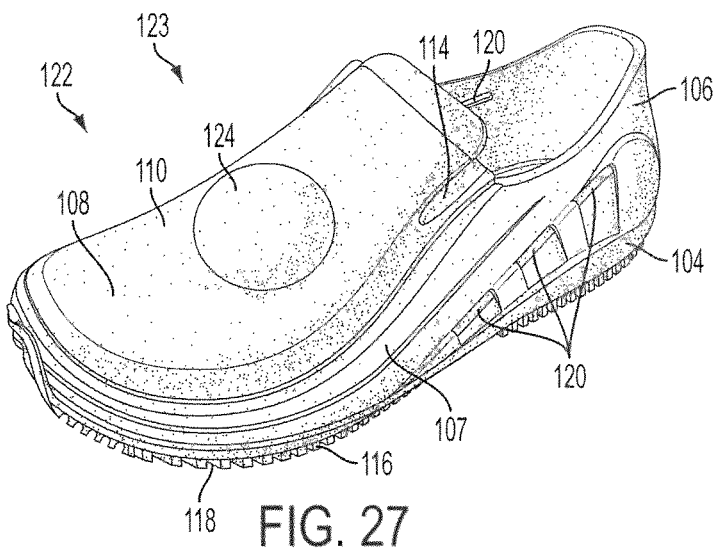
FIG. 27 is a top perspective view of a second slip on embodiment using the molded shoe frame of FIGS. 21-23.
Figure 28:
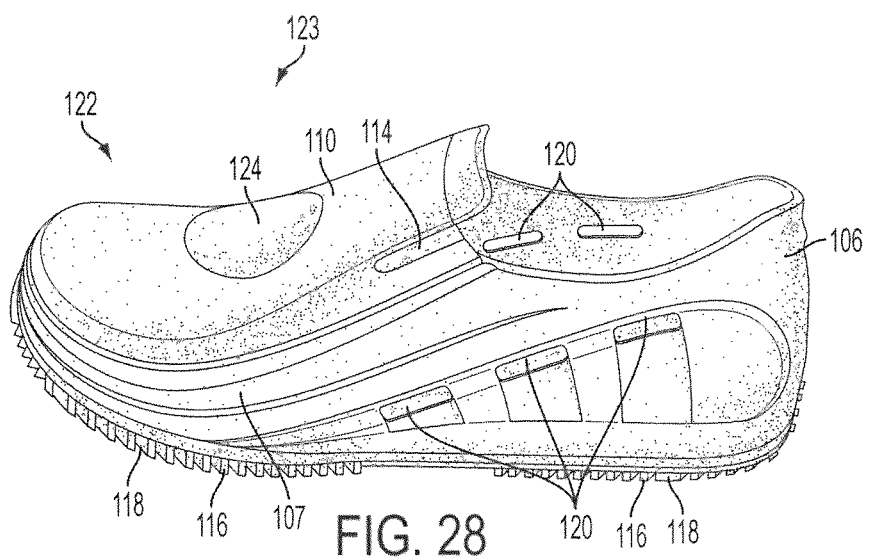
FIG. 28 is a side view of the second slip on embodiment of FIG. 27.
Figure 29:
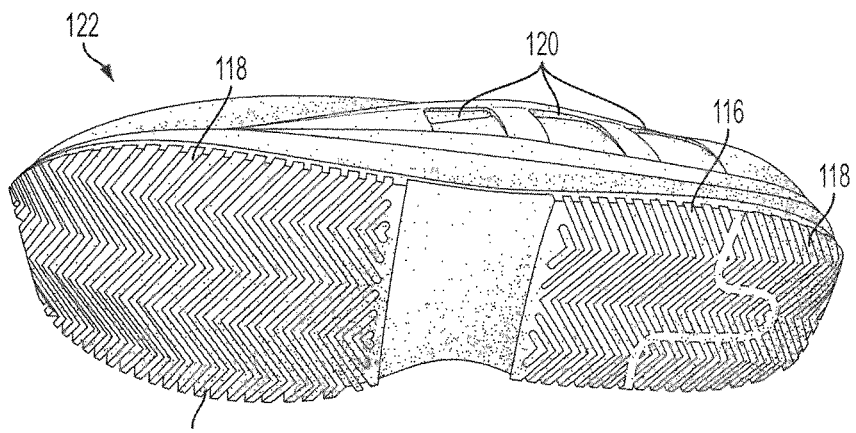
FIG. 29 is a bottom view of second slip on embodiment of FIG. 27.

FIGS. 27-29 show another restaurant shoe embodiment 122 using the frame 102 shown in FIGS. 21-23. A second set of upper components 123 are attached to the frame and include elastic goring 114 on the medial and laterals sides and a vamp 110 fabricated from a material adapted to receive photographs or other graphics 124—in this case an egg image. Restaurant shoe 122 illustrates one of virtually unlimited customized design possibilities that can be economically generated using the frame 102 of FIGS. 21-23. Further design options include molding the frame 102 and outsole 116 from the same or different colors. For example, a shoe may have a black frame and an orange outsole.

FIG. 30 shows a further shoe embodiment 100 using the frame 102 shown in FIGS. 21-23 and the components of FIGS. 27-29. Another set of upper components are attached to the frame and include elastic goring 114 on the medial and laterals sides and a vamp 110.

Figure 31:
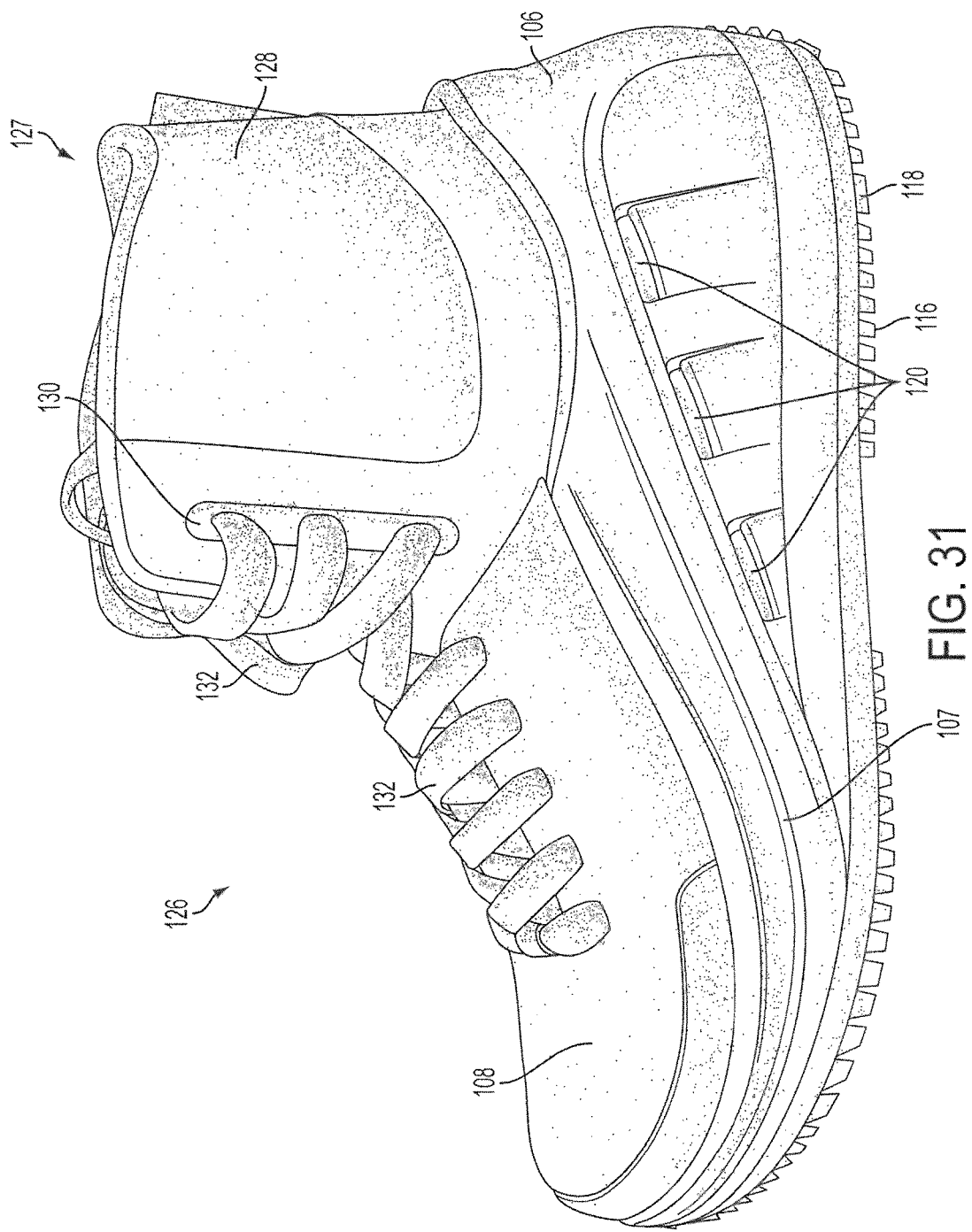
FIG. 31 is a side view of a high top embodiment using the molded shoe frame of FIGS. 21-23.

A high top sneaker or boot embodiment 126 is illustrated in FIGS. 31-32 that incorporates the frame 102 shown in FIGS. 21-23. Boot 126 uses the frame 102 shown in FIGS. 21-23, but has a third set of upper components 127 including a high top quarter 128, eyelet overstays 130 attached to the frame 102, and laces 132 secured to the eyelets. Again, the third set of upper components 127 are configured for attachment to the base frame 102.

As should be appreciated, multiple footwear types, sneakers, backless shoes, skate shoes, slip-ons, boots, oxford, mules and moccasins etc., can be made from a single generic molded frame. Another important feature of the frame 12, 102 is that a water proof and insulated product is achievable without additional expensive materials such as Gore-Text® or Thinsulite®. Alternatively, a vented footwear 10 product is contemplated by creating openings in the frame. Yet another feature is that graphic treatments such as molded designs, color, laser etching, photographs and screen printing can be applied to the frame. As such, the frame can be finished in such a way that it is not readily apparent that the same generic base frame is being used for multiple styles in a footwear collection. In some applications, it will also be difficult to discern that the footwear article is made of an injection molded EVA frame.

What is claimed:
1. A footwear collection comprising:
    a generic molded base frame including a midsole, a portion of an outsole and a portion of an upper integrally molded together as a single integral unit, wherein said upper includes panels extending from opposing sides of said midsole and a toe cap extending between said panels and at least partially over said midsole, and wherein said portion of said outsole includes a ground-contacting portion;
    a first set of components secured to said base frame for forming a first shoe type; and
    a second set of components secured to said base frame for forming a second shoe type different from the first type, wherein at least a portion of said panels and said toe cap of said upper of said base frame are exposed and visible on an outside surface of said first shoe type and said second shoe type after complete assembly of said first set of components to said base frame and said second set of components to said base frame to respectively form said first shoe type and said second shoe type, wherein said first set of upper components comprises a quarter, a tongue and a plurality of eye stay overlays secured to said base frame and laces attached to the eye stays, wherein said first shoe type is a sneaker; and wherein said second set of upper components comprises a vamp without a heel counter, wherein said second type of footwear is a backless shoe, and wherein at least a portion of said ground-contacting portion is exposed to the ground after one of said sets of components is assembled with said generic molded base frame.

2. The footwear collection of claim 1, further comprising a third set of upper and outsole components secured to said base frame for forming a third shoe type, wherein at least the upper components of the third set are different from the first and second sets.

3. The footwear collection of claim 1, wherein said base frame further comprises a molded surface texture.

4. The footwear collection of claim 2, wherein said third set of upper components includes a vamp and ankle enclosure and said third shoe type is a high top shoe; and further comprising a fourth shoe type having a fourth set of upper components includes a vamp and said fourth shoe type is a slip-on shoe.

5. The footwear collection of claim 1, wherein said set first set of upper components comprises elastic goring attached to a vamp.

6. The footwear collection of claim 5, wherein a photographic image is secured to the vamp.

7. The footwear collection of claim 1, further comprising a third set of upper components comprises an ankle-length heel collar.

8. The footwear collection of claim 1, wherein said portion of an outsole has an anti-slip tread pattern.

9. The footwear collection of claim 1, wherein said base frame has a plurality of openings along a lateral side of said portion of said upper for ventilation.

10. The footwear collection of claim 1, wherein said base frame is injection molded and said shoe types are assembled without lasts.

11. A method of making a footwear collection, the collection including at least first and second shoe types, the method comprising:
   molding a generic base frame, the generic base frame including a midsole, an outsole portion and an upper portion which are molded together as a single, integral piece, said upper portion including panels extending from opposing sides of said midsole and a toe cap extending between said panels and at least partially over said midsole;
   attaching one or more outsole components to said base frame;
   providing a first set of upper components and a second set of upper components, said first set of upper components including a quarter and said second set of upper components includes a vamp;
   attaching said first set of upper components, separately from said one or more outsole components, to a first portion of said molded base frame to form the first shoe type, which is a sneaker; and
   attaching said second set of upper components, separately from said one or more outsole components, to a second portion of said molded base frame to form the second shoe type, which is a backless shoe,
   wherein at least a portion of said panels and said toe cap of said upper of said base frame are exposed and visible on an outside surface of said first shoe type and said second shoe type after complete assembly of said first set of upper components to said base frame and said second set of upper components to said base frame to respectively form said first shoe type and said second shoe type, wherein at least a portion of said one or more outsole components is exposed to the ground after one of said sets of upper components is assembled with said generic base frame.

12. The method of claim 11, wherein said first set of upper components further including a vamp.

13. A method of making a footwear, comprising
   forming a plurality of shoe frames by injection molding a single, unitary, integral midsole, a portion of an outsole, an upper panel and a toe cap extending at least partially over said midsole, wherein said midsole, said portion of said outsole, said upper panel and said toe cap are the same for each of said shoe frames;
   securing to one of said shoe frames, a first upper element and a first outsole element to form a first style of footwear, said first upper element including a heel quarter and laces, wherein the first style of footwear is a sneaker; and
   securing to said one of said shoe frames, a second upper element and a second outsole element to form a second style of footwear, said second upper element including a vamp without a heel quarter, wherein said second style of footwear is a backless shoe, said second upper element and second outsole element being different from said first upper element and said first outsole element, respectively,
   wherein at least a portion of said upper panel and said toe cap are exposed and visible on an outside surface of said first style of footwear and said second style of footwear after complete assembly of one of said shoe frames and said first upper element and said first outsole element, and one of said shoe frames and said second upper element and said second outsole element to respectively form said first style of footwear and said second style of footwear, and
   wherein at least a portion of said upper panel on each of said plurality of shoe frames is exposed after one of said upper elements and said outsole elements are assembled with at least one of said plurality of shoe frames.

14. The method of making a footwear of claim 13, wherein said first upper element further including a pair of eye stay overlays and eyelet elements; and said vamp of said second upper element includes elastic goring.

15. The method of making footwear of claim 13, wherein said first upper element includes a vamp; and a third upper element including a vamp and ankle enclosure and forms a third style of footwear that is a boot.

16. The footwear collection of claim 1, wherein said midsole, said portion of said outsole and said portion of said upper are the same for the first and second shoe types including said generic molded base frame.

* * * * *